United States Patent
Smithies et al.

(10) Patent No.: US 6,409,787 B1
(45) Date of Patent: Jun. 25, 2002

(54) BICOMPONENT SUBSTRATE FOR FILTER ELEMENT WITH MEMBRANE

(75) Inventors: Alan Smithies, Evan, GA (US); Vikas Madhusudan Nadkarni, Pune (IN)

(73) Assignee: BHA Technologies, Inc., Kansas City, MO (US)

( * ) Notice: Subject to any disclaimer, the term of this patent is extended or adjusted under 35 U.S.C. 154(b) by 0 days.

(21) Appl. No.: 09/599,706

(22) Filed: Jun. 22, 2000

Related U.S. Application Data

(63) Continuation-in-part of application No. 09/277,516, filed on Mar. 26, 1999, now Pat. No. 6,110,249.

(51) Int. Cl.$^7$ .............................................. B01D 29/13
(52) U.S. Cl. ............................ 55/514; 55/498; 55/524; 55/528; 55/DIG. 5; 96/13
(58) Field of Search ......................... 55/497, 498, 500, 55/514, 524, 528, DIG. 5; 96/12, 13

(56) References Cited

U.S. PATENT DOCUMENTS

| | | |
|---|---|---|
| 4,536,440 A | 8/1985 | Berg |
| 4,657,804 A | 4/1987 | Mays et al. |
| 4,816,328 A | 3/1989 | Saville et al. |
| 4,877,433 A | 10/1989 | Oshitari |
| 4,878,930 A | 11/1989 | Manniso et al. |
| 4,917,714 A | 4/1990 | Kinsley, Jr. |
| 4,983,434 A | 1/1991 | Sassa |
| 5,037,457 A | 8/1991 | Goldsmith et al. |
| 5,082,472 A | 1/1992 | Mallouk et al. |
| 5,096,473 A | 3/1992 | Sassa et al. |
| 5,108,474 A | 4/1992 | Riedy et al. |
| 5,154,827 A | 10/1992 | Ashelin et al. |
| 5,207,812 A | 5/1993 | Tronto et al. |
| 5,284,704 A | 2/1994 | Kochesky et al. |
| 5,318,831 A | 6/1994 | Hirama et al. |
| 5,478,372 A | 12/1995 | Stark |
| 5,504,139 A | 4/1996 | Davies et al. |
| 5,507,847 A | 4/1996 | George et al. |
| 5,527,569 A | 6/1996 | Hobson et al. |
| 5,540,979 A | 7/1996 | Yahiaoui et al. |
| 5,580,459 A | 12/1996 | Powers et al. |
| 5,593,778 A | 1/1997 | Kondo et al. |
| 5,607,491 A | 3/1997 | Jackson et al. |
| 5,658,269 A | 8/1997 | Osborn, III et al. |
| 5,665,235 A | 9/1997 | Gilderterver et al. |
| 5,792,242 A | 8/1998 | Haskett |
| 5,855,783 A | 1/1999 | Shucosky et al. |
| 5,888,275 A | 3/1999 | Hamasaki et al. |
| 6,027,553 A | 2/2000 | Hirano et al. |
| 6,030,428 A | 2/2000 | Ishino et al. |
| 6,030,484 A | 2/2000 | Maeoka et al. |
| 6,110,243 A * | 8/2000 | Wnenchak et al. ....... 55/528 X |
| 6,110,249 A * | 8/2000 | Medcalf et al. ............... 55/514 |
| 6,146,436 A * | 11/2000 | Hollingworth et al. ... 55/528 X |

FOREIGN PATENT DOCUMENTS

| | | |
|---|---|---|
| DE | 42 34816 C1 | 10/1993 |
| EP | 0 576 343 A2 | 12/1993 |
| GB | 2 297 945 A | 8/1996 |
| JP | 03-052610 A | 3/1991 |

* cited by examiner

*Primary Examiner*—Robert H. Spitzer
(74) *Attorney, Agent, or Firm*—Greg Strugalski

(57) ABSTRACT

A filter element comprises a substrate constructed from at least two different materials. A first one of the materials has a first temperature at which the first material activates. A second one of the materials is at least a partially crystalline structure and has a second temperature which is lower than the first temperature at which the second material activates. A porous membrane is supported by the substrate. An attachment is between the substrate and the membrane. The attachment results from the second material of the substrate activated at a temperature less than the first temperature to engage portions of the membrane at spaced apart locations and fix together the membrane and the substrate upon the second material cooled to a temperature less than the second temperature.

20 Claims, 4 Drawing Sheets

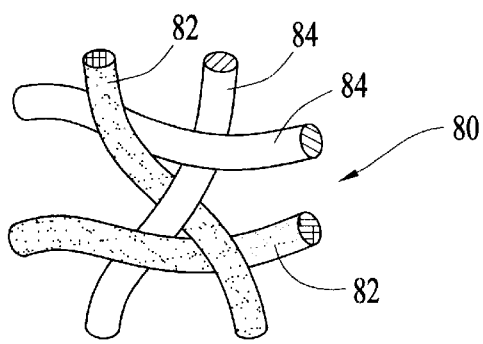
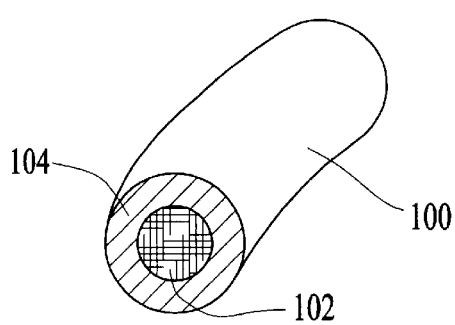
FIG. 10     FIG. 11
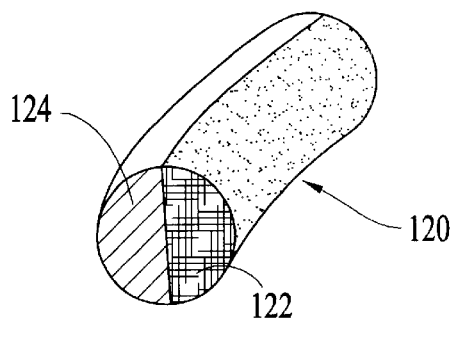
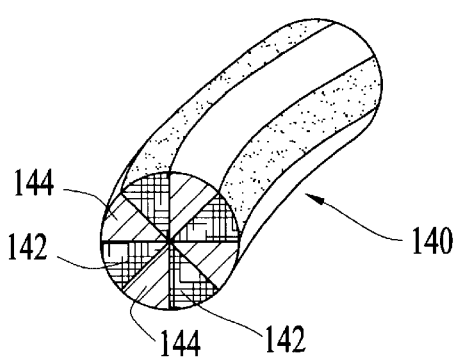
FIG. 12     FIG. 13
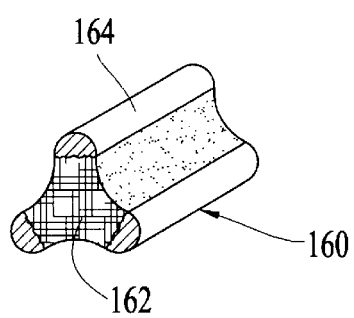
FIG. 14

BICOMPONENT SUBSTRATE FOR FILTER ELEMENT WITH MEMBRANE

This is a continuation-in-part of patent application Ser. No. 09/277,516, filed Mar. 26, 1999 and entitled Filter Element with Membrane and Bicomponent Substrate, now U.S. Pat. No. 6,110,249.

BACKGROUND OF THE INVENTION

1. Technical Field

The present invention relates generally to a filter and filter element construction. In particular, the present invention relates to a filter element that includes a supporting substrate made from at least two materials with different temperatures at which they are able to soften and flow.

2. Description of the Prior Art

It is known that efforts throughout the world to improve air quality continually increase through treaties, laws and regulations which limit the amount of industrial emissions that may be released into the atmosphere. Improved and more efficient filters that minimize and reduce the release of emissions have been developed. One such filter includes a filter element with a microporous expanded polytetrafluoroethylene (ePTFE) membrane. The membrane assumes a relatively large percentage of the filtering duties when attached to a support structure, such as a substrate, by a mechanism referred to as "surface filtration".

It is known that problems can result from attaching together the membrane and the substrate. For example, the membrane may be attached to the substrate by a laminating operation that typically includes thermal bonding. In one type of thermal bonding process, fibers at an external surface of the substrate are singed to increase the area of the substrate that can contact the membrane. The membrane and singed areas of the substrate are brought into intimate contact. The singed areas of the substrate are then melted onto the membrane by the application of heat. The melted portions of the substrate flow into pores in the membrane. Once the melted portions of the substrate cool and solidify, the membrane is fixed to the substrate.

However, the material used in the substrate can melt uncontrollably and engage a relatively large surface area of the membrane. Melted portions of the substrate that solidify can block a substantial portion of the pores in the membrane and reduce the effective filtering area of the membrane. Thus, filtration efficiency is detrimentally affected due to less than maximum airflow through the filter element and a relatively large pressure drop across the filter element can result. It is also known that as the melted portions of the substrate cool to solidify and attach to the membrane, the melted portions may contract. When the melted portions of the substrate are exposed to changes in temperature, such as during thermal cycling in the environment in which the filter element operates, the melted portions may expand and contract. The membrane may not be able to match this expansion and/or contraction which can overstress the membrane causing the membrane to tear or crack adjacent the melted portions.

The use of a needled felt substrate having core-sheath copolyester/polyester (COPET/PET) fibers for thermal bonding to produce paper-like and lofty non-wovens without the use of resin bonding is known. However, the known COPET materials used are amorphous copolyesters with softening points in the range of 65° C.–180° C. (150° F.–355° F.). The anticipated continuous use operating temperatures of certain filter elements made from an ePTFE/felt substrate laminate can be in the range of about 135° C.–150° C. (275° F.–300° F.). It is critical that the bonding material does not soften to flow or melt when continuously exposed to these relatively high operating temperatures to ensure that the mechanical adhesion and dimensional stability of the laminate is accomplished and maintained throughout the service life of the laminate. It is also important that the substrate does not expand and contract an amount that the membrane cannot accommodate.

Thus, there is a need in the filtration art for an improved filter element that is durable when exposed to various environments at relatively elevated temperatures and thermally cycled.

SUMMARY OF THE INVENTION

The present invention is directed to a filter element. The filter element includes a porous membrane and a substrate made from at least two different materials. A first one of the materials has a first temperature at which the first material activates. A second one of the materials is at least partially crystalline and has a second temperature which is lower than the first temperature at which the second material activates. The porous membrane is supported by the substrate. An attachment exists between the substrate and the membrane. The attachment results from the second material of the substrate being activated at a temperature less than the first temperature to engage portions of the membrane at spaced apart locations and fix together the membrane and the substrate upon the second material cooled to a temperature less than the second temperature.

The porous membrane is microporous and made from expanded polytetrafluoroethylene. At least a portion of the substrate comprises a multiplicity of bicomponent staple fibers selected from the structures including core-sheath, side-by-side, segmented and lobed. A portion of each of the fibers is made of the first material. Another portion of each of the fibers is made of the second material.

The substrate may further include a cap and a base. The cap is located adjacent the membrane. The cap includes the second material present in a percentage of not more than fifty percent by weight or by volume. The second material is temperature stabilized at a temperature less than the second temperature. Each of the fibers has a diameter of 40 microns or less. Each of the fibers has a denier of 8 or less.

BRIEF DESCRIPTION OF THE DRAWINGS

Further features of the present invention will become apparent to those skilled in the art to which the present invention relates from reading the following description with reference to the accompanying drawings, in which:

FIG. 10 is an enlarged schematic illustration of a bicomponent blend of fibers of the present invention used in a substrate of the filter element;

FIGS. 11–14 are enlarged schematic illustrations of bicomponent fiber constructions for use in the substrate of the present invention.

DESCRIPTION OF PREFERRED EMBODIMENTS

Figure 1:
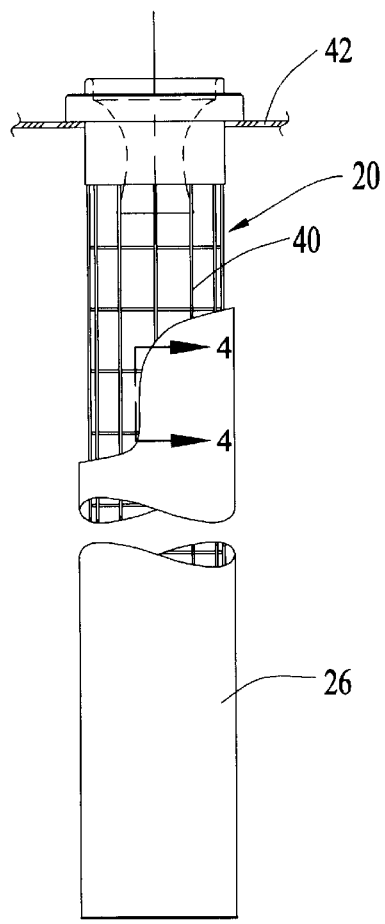
FIG. 1 is a schematic view of a bag filter assembly having a filter element embodying the present invention with a portion of the bag removed for clarity.
Figure 2:
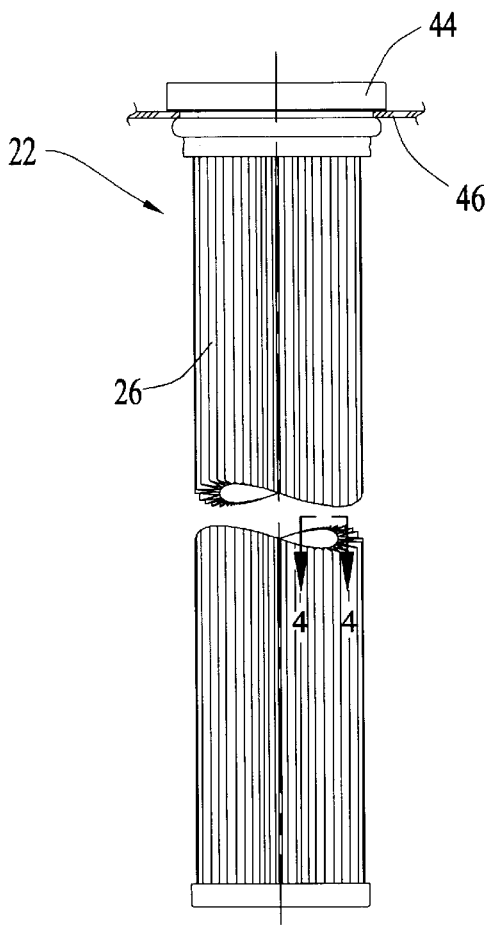
FIG. 2 is a schematic view of a cartridge filter having a pleated filter element embodying the present invention.
Figure 3:
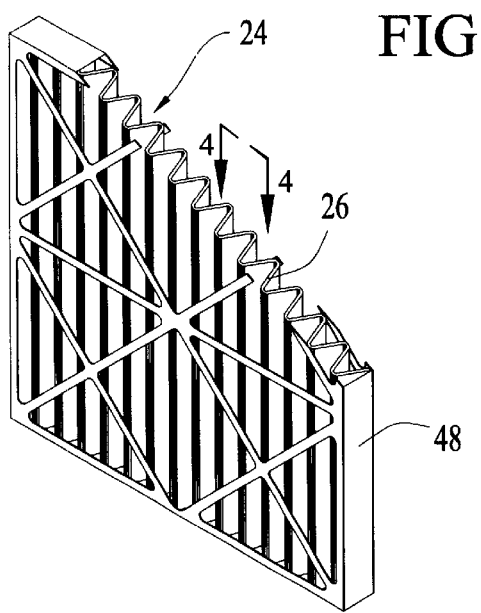
FIG. 3 is a perspective view of an HVAC filter, partly in section, having a pleated filter element embodying the present invention.
Figure 4:
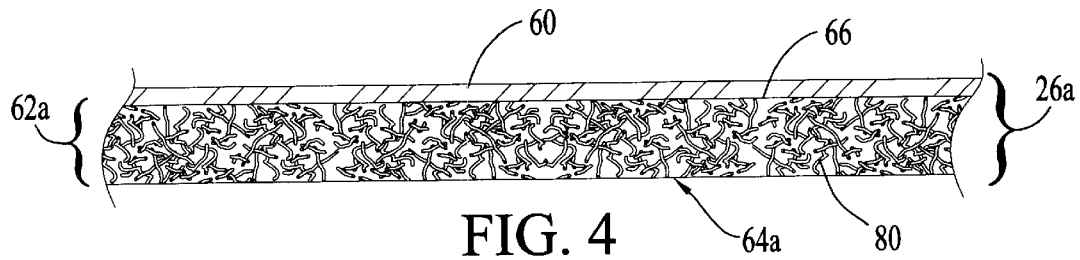
FIG. 4 is an enlarged cross-sectional view of the filter element, illustrated in FIGS. 1–3, constructed according to one embodiment of the present invention and taken in a direction approximately along the lines 4—4.

A filter 20, 22 or 24 (FIGS. 1–3) includes a filter element constructed according to the present invention and generally designated with the reference number 26. The filter element 26 is made to filter particulate matter from a fluid stream, such as a gas stream. The filter element 26 is constructed to meet the requirements for its intended filtering function while being continually exposed to an elevated operating temperature. The filters 20, 22, 24 that include the filter element 26 are shown for illustration purposes only and are not intended to limit the spirit and scope of the present invention.

By way of example, a bag filter 20 (FIG. 1) that includes the filter element 26 is supported against radially inward collapse by a wire cage 40, as known in the air pollution control art. The cage 40 is attached to a baghouse tubesheet 42. Another example is a cartridge filter 22 (FIG. 2) that includes the pleated filter element 26 attached to a mount 44. The mount 44 supports the cartridge filter 22 on a baghouse tubesheet 46. Yet another example is an HVAC filter 24 (FIG. 3) that includes the filter element 26 and a frame 48. The frame 48 supports the filter element 26 and is receivable in a suitable known housing (not shown).

The filter element 26a–26f (FIGS. 4–9), embodying the present invention and incorporated into any of the filters 20, 22, 24 (FIGS. 1–3), includes a surface filtering membrane 60 and a substrate, generally designated with the reference number 62. The filtering membrane 60 is porous, preferably microporous, and is supported by the substrate 62a–62f as illustrated in FIGS. 4–9. A preferred suitable microporous membrane 60 is one made from expanded polytetrafluoroethylene (ePTFE).

The microporous ePTFE filtering membrane 60 is preferably located upstream relative to the substrate 62a–62f in the gas stream to provide surface filtration. The membrane 60 is physically attached to the substrate 62a–62f at many numerous locations of relative by small areas. The substrate 62a–62f may be of any suitable construction that allows a relatively large amount of gas to pass through it and that is capable of performing some filtration if required. The substrate 62a–62f preferably has a structure, such as scrimed needled felt 64b (FIG. 5), 64d (FIG. 7), 64e (FIG. 8) or 64f (FIG. 9), or a scrimless needled felt 64a (FIG. 4) or 64c (FIG. 6).

The substrate 62a–62f is made from at least two different synthetic polymer materials. A first one of the materials has a relatively high first temperature at which it "activates" or begins to soften so it can flow or melt. A second one of the materials has a second temperature that is relatively lower than the first temperature at which it "activates" or begins to soften so it can flow or melt. Preferably, the second material is partially crystalline so it will not melt or soften to flow when exposed during operation to the relatively high average maximum operating temperature that the filter element 26 is designed to withstand. The term "partially crystalline" as used throughout the specification and claims is intended to mean partially crystalline, semi-crystalline, fully crystalline or crystalline.

The substrate 62 is temperature stabilized during its manufacture so it will not expand or shrink unexpectedly during lamination or operation or at a rate or amount that the membrane 60 cannot match or accommodate without cracking or tearing. This temperature stabilization is performed at a temperature less than the second temperature but sufficiently high enough to eliminate any unexpected or unaccounted for expansion or contraction of the substrate 62. Since the second material is at least partially crystalline, it can be temperature stabilized more easily at a temperature lower than the second temperature than a material with an amorphous structure.

When the second material of the substrate 62 is heated to a temperature equal to or greater than the second temperature but less than the first temperature, only the second material activates or softens to flow and the first material retains its properties, such as tensile strength. Since the second material activates at a relatively lower temperature than the first material, only the softened portions of the second material flow to engage the membrane 60 at the numerous locations, each with relatively small areas of contact, to attach the membrane to the substrate 62a–62f. Prior to activation, the second material is preferably located in positions in the substrate 62a–62f where it can readily engage the membrane 60, such as a major exterior side surface 66 of the substrate 62 when it softens and begins to flow. During operation, the second material does not activate or soften to flow as long as the operating temperature remains lower than the second temperature. The partially crystalline second material will not unexpectedly or unaccountedly expand or contract if the operating temperature is less than the second temperature that the filter element 26 is designed for.

In one embodiment of the present invention, the filter element 26a (FIG. 4) includes the membrane 60 and the substrate 62a. The substrate 62a is constructed as a scrimless needled felt 64a. At least a portion of the needled felt 64a includes a multiplicity of fibers, such as a blend 80 (FIG. 10) of fibers 82, 84 or any of the bicomponent fibers 100, 120, 140 or 160 (FIGS. 11–14). The blend 80 of the fibers 82, 84 or any of the bicomponent fibers 100, 120, 140 or 160 may be used in the needled felt 64a as a thin layer or "cap" only at the major exterior side surface 66 located adjacent the membrane 60 or throughout the entire needled felt. Preferably, the blend 80 of fibers or the bicomponent fibers 100, 120, 140 or 160 is located primarily adjacent the membrane 60.

In the one embodiment, the needled felt 64a includes a homogenous blend 80 (FIG. 10) of first fibers 82 and second fibers 84 located adjacent the membrane. That is the blend 80 has fifty percent by weight of the first fibers 82 and fifty percent by weight of the second fibers 84. The blend 80 also may include a non-homogenous mixture of the fibers 82, 84 in any suitable ratio. The first fibers 82 are made of the first material that has the relatively high first activation temperature at which it begins to soften and flow or melt. The second fibers 84 are made of the partially crystalline second material that has the second and relatively lower activation temperature which is less than the first activation temperature of the first material at which the second material begins to soften and flow or melt. Throughout the specification and claims, it is intended that the term "activation" means the temperature of a material at which the material begins to soften and flow or melt.

The second fibers 84 activate at a relatively lower temperature than the first fibers 82 activate at and are located in a position to contact the membrane 60. The second fibers 84 begin to soften and flow so a portion of the second fibers can contact and surround relatively small areas of the membrane 60 to form attachments connecting the substrate 62a to the membrane upon cooling and solidification. The partially crystalline second material remains attached to the membrane 60 after cooling to a temperature less than the second temperature and retains its thermal and mechanical stability in the relatively high operating temperature environment. It will be apparent that the second fibers 84 will also melt to attach to other second fibers and first fibers 82 in the needled felt 64a. The first fibers 82 do not activate and are relatively unaffected when exposed to the temperature at which the second material activates so the first fibers retain substantially all of their physical properties, such as tensile strength, elasticity and the like.

There is enough difference between the activation temperatures of the two materials of the fibers 82,84 and the application of heat can be controlled sufficiently so that activation of only the second material occurs. For the blend 80 of fibers 82, 84 or one of the bicomponent fibers 100, 120, 140, 160 when the first material is made, for example from polyester (polyethylene terephthalate or PET), the first activation temperature is in the range of about 480° F. to 495° F. When the second material is made, for example from partially crystalline polybutylene terephalate (PBT), the second activation temperature is in the range of about 425° F. to 430° F. The heat stabilization temperature for the substrate 62a is preferably about 380° F. The substrate 62a is preferably designed for an average maximum operating temperature that it will be exposed to is in the range of 275° F. to 300° F. which is below the second activation temperature of the second material.

Any combination of first and second materials suitable for the predetermined operating environment is acceptable as long as the activation temperature of the first material is greater than the activation temperature of the second material. The anticipated average continuous use operating temperatures of the filter element 26 depend on specific applications. The second material must not activate at these average continuous use operating temperatures. This is critical to ensure the structural and functional integrity of the filter element 26. For example and without limitation, suitable first materials could further include polyacrylonitrile (PAN), polyphenylene sulphide (PPS) or poly (metaphenylene isophthalamnide) (Nomex®). Also by way of example and without limitation, suitable second materials could further include copolyesters based on PTA/IPA (COPET), polyarylether ketone (PEK), polyetherether ketone (PEEK), polyamide 6 (Nylon 6), polyamide 66 (Nylon 66), polyamide 46 (Nylon 46), polyethylene napthalate (PEN), polybutylene napthalate (PBN) ,CHDM based copolyesters (PETG) CHDM/IPA based copoly esters (PCTA) or CHDM based homopolyester (PCT). Suitable combinations of first and second materials could further include without limitation PET/Nylon 6, PET/COPET, PAN/Nylon 66, PAN/PETG, PAN/PCTA, PPS/PEN, PPS/Nylon 66, PPS/PETG, Nomex/PCT, Nomex/PEEK or Nomex/PCTA.

Partially crystalline polymers have advantages in thermal stability and mechanical properties when compared to amorphous polymers so there is less tendency to unexpectedly expand or contract which could cause the membrane 60 to crack near the attachment locations. Additionally, the solvent and chemical resistance of partially crystalline polymers is better than that of amorphous polymers. Good chemical resistance is an important performance attribute for the filter element 26.

The needled felt 64a of the substrate 62a may also be constructed to include any of the bicomponent staple fibers 100 (FIG. 11), 120 (FIG. 12), 140 (FIG. 13), 160 (FIG. 14) or a mixture of any of these fibers. For example, in an alternate embodiment of the present invention, at least a portion of the needled felt 64a of the substrate 62a, such as the portion adjacent the membrane 60, may comprise a multiplicity of bicomponent staple core-sheath fibers 100 (FIG. 11). The inner core 102 of each fiber 100 is made of the first material with the relatively higher first activation temperature. The outer sheath 104 of each fiber 100 is made of the partially crystalline second material with the second activation temperature that is relatively lower than the first activation temperature of the first material. The sheath 104 activates at the relatively lower second activation temperature than the core 102 and is located in a position on the fiber 100 to contact and attach to the membrane 60. The core 102 is relatively unaffected when exposed to the second temperature at which the second material activates as well as at the average continuous use operating temperature that the filter element 26 is exposed to, so the first material retains its properties, such as tensile strength and elasticity.

In another alternate embodiment of the present invention, at least a portion of the needled felt 64a of the substrate 62a, such as the portion adjacent the membrane 60, comprises a multiplicity of bicomponent staple side-by-side fibers 120 (FIG. 12). At least a portion 122 of each side-by-side fiber 120 is made from the first material with the first activation temperature. The remaining portion 124 of each fiber 120 is made from the partially crystalline second material with the relatively lower second activation temperature. The portion 122 of the fiber 120 is illustrated as being approximately equal to the size of the portion 124, but it should be apparent that the size of the each portion may be of any predetermined suitable relative size.

In yet another alternate embodiment of the present invention, at least a portion of the needled felt 64a of the substrate 62a, such as the portion adjacent the membrane 60, may comprise a multiplicity of bicomponent staple segmented fibers 140 (FIG. 13). Several segments 142 of each segmented fiber 140 are made from the first material with the first activation temperature. Several segments 144 of the segmented fiber 140 are made from the partially crystalline second material with the relatively lower second activation temperature. The segmented fiber 140 may include any suitable number of segments 142 made from the first material and segments 144 made from the second material. The segments 142, 144 of the fiber 140 are illustrated as being equal in size and having a wedge-shaped cross-section. It will be apparent that the segments 142, 144 of the fiber 140 can be of any suitable relative size and shape.

In still another alternate embodiment of the present invention, at least a portion of the needled felt 64a of the substrate 62a, such as the portion adjacent the membrane 60, may comprise a multiplicity of bicomponent staple lobed fibers 160 (FIG. 14). A centrally located body portion 162 of the lobed fiber 160 is made from the first material with the first activation temperature. At least one lobe 164 of the lobed fiber 160 is made from the partially crystalline second material with the relatively lower second activation temperature. The lobed fiber 160 may include any suitable number of lobes 162 made from the second material. The lobes 164 of the fiber 160 are positioned on the fiber to be the radially outermost part of the fiber for the best possibility of contacting the membrane 60 without the body portion 162 contacting the membrane. The lobes 164 of the fiber 160 are illustrated as being equal in size, having a semi-circular cross-section and occupying an approximately equal amount of external surface area of the fiber 160. It will be apparent that the lobes 164 of the fiber 160 can be of any suitable relative size, number and shape.

In another embodiment of the present invention, the filter element 26b (FIG. 5) includes the membrane 60 and a substrate 62b. The substrate 62b is constructed with needled felt 64b on a support scrim 180. The scrim 180 is illustrated as extending substantially through the middle of the needled felt 64b, but it will be apparent that the scrim could be located in any suitable position in the needled felt.

The scrimed needled felt 64b of the substrate 62b includes a blend 80 of the fibers 82, 84 (FIG. 10) located above, as viewed in FIG. 5, and below the scrim 180. It will be apparent that some or mostly second fibers 84 could be used above the scrim 180 and mostly or all first fibers 82 be used below the scrim. At least a portion of the scrimed needled felt 64b of the substrate 62b includes a multiplicity of fibers, such as the blend 80 (FIG. 10) of the fibers 82, 84 or any of the bicomponent fibers 100, 120, 140, 160 (FIGS. 11–14). The blend 80 of the fibers 82, 84 or any of the bicomponent fibers 100, 120, 140 or 160 (FIGS. 11–14) may be used in the substrate 62b only adjacent the membrane 60 or throughout the entire substrate.

The needled felt 64b of the substrate 62b (FIG. 5) may include a homogenous blend 80 (FIG. 10) of the fibers 82 made from the first material and the fibers 84 made from the partially crystalline second material. The blend 80 also may include a non-homogenous mixture of the fibers 82, 84 in any suitable relative ratio. The second fibers 84 activate first at the lower second temperature than the first fibers 82 and are located in a position to contact and attach to the membrane 60. The first fibers 82 are relatively unaffected when exposed to the temperature at which the crystalline second material activates so the first fibers 82 retain their physical properties, such as tensile strength and elasticity.

There is enough difference between the activation temperatures of the two materials and the application of heat can be controlled sufficiently so that activation of only the partially crystalline second material occurs. The substrate 62b may also be constructed to include the bicomponent staple core-sheath fibers 100 (FIG. 11), side-by-side fibers 120 (FIG. 12), segmented fibers 140 (FIG. 13) or lobed fibers 160 (FIG. 14) as described above in any location, but preferably at least adjacent the membrane 60.

The filter element 26c (FIG. 6) includes the membrane 60 and a substrate 62c. The substrate 62c includes scrimless needled felt 64c with a base 220 and a cap 222. The cap 222 includes at least a portion of the second fibers 84 (FIG. 10) made from the partially crystalline second material with the relatively lower second melting temperature. The second fibers 84 of the cap 222 are preferably needled into the fibers 82 of the base 220 to mechanically connect the cap and base. The base 220 is preferably made mostly from the first fibers 82 made from the first material with the first and relatively higher activation temperature. Preferably, the cap 222 is significantly thinner than the base 220. The cap 222 is located adjacent the membrane 60 to place the second material with the relatively lower second activation temperature adjacent the membrane 60. The cap 222 has the second material present in an amount no greater than fifty percent (50%), and preferably twenty five percent (25%), by weight or by volume of the total material in the cap.

The second fibers 84 in the cap 222 activate first at the relatively lower second activation temperature than the first fibers 82 The first fibers 82 are relatively unaffected when exposed to the temperature at which the second material activates so the first fibers 82 retain their physical properties, such as tensile strength and elasticity. There is enough difference between the first and second activation temperatures of the two materials and the application of heat can be controlled sufficiently so that melting of only the second material occurs. The cap 222 may also be constructed to include the staple bicomponent core-sheath fibers 100 (FIG. 11), side-by-side fibers 120 (FIG. 12), segmented fibers 140 (FIG. 13) or lobed fibers 160 (FIG. 14) as described above.

The base 220 and cap 222 of the substrate 62c (FIG. 6) may be made in separate manufacturing operations and then later needled together. The substrate 62c may also be made by needling the base 220 and cap 222 together in a single needling operation.

In another embodiment of the present invention, the substrate 62d (FIG. 7) is constructed to have a needled felt 64d in two layers on opposite sides of a scrim 240. A first base layer 242 includes a majority of fibers made from the first material with the relatively higher activation temperature located below the scrim 240, as viewed in FIG. 7. A second cap layer 244 is located above the scrim 240, as viewed in FIG. 7, and is located adjacent the membrane 60. The second layer 244 includes at least a portion of the partially crystalline second material with the relatively lower second activation temperature. The thickness of the first layer 242 is illustrated in FIG. 7 as being substantially equal to the thickness of the second layer 244, but it will be apparent that the first layer could be different in thickness than the second layer.

The second layer 244 of the substrate 62d may include the blend 80 of fibers 82, 84 made from two different materials having different activation temperatures or any of the bicomponent fibers 100, 120, 140 or 160 (FIGS. 11–14) as described above. The portion of the second layer 244 of the scrimed needled felt 64d may be constructed to include any of the bicomponent core-sheath fibers 100 (FIG. 11), side-by-side fibers 120 (FIG. 12), segmented fibers 140 (FIG. 13), or lobed fibers 160 (FIG. 14) described above. For example, in an alternate embodiment of the present invention, at least a portion of the second layer 244 may comprise a multiplicity of bicomponent staple core-sheath fibers 100, 120, 140, or 160 located at least adjacent the membrane 60.

Figure 7:
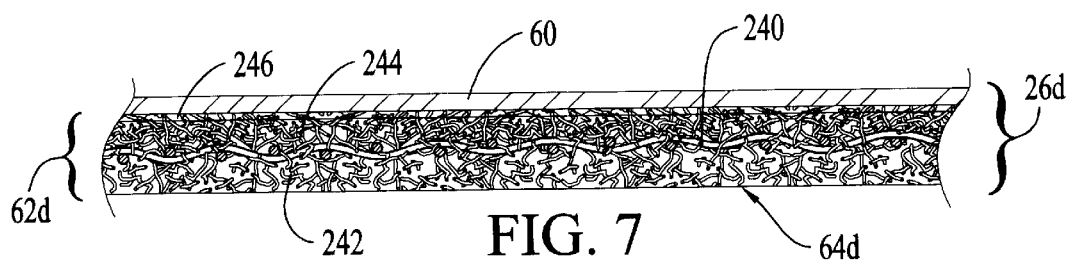
Figure 8:
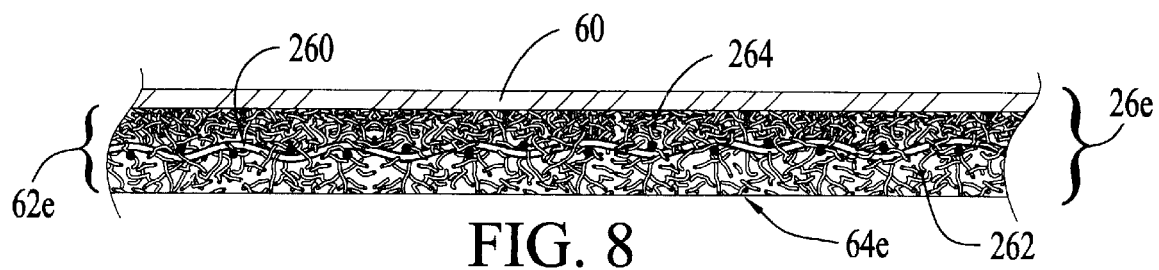
Figure 9:
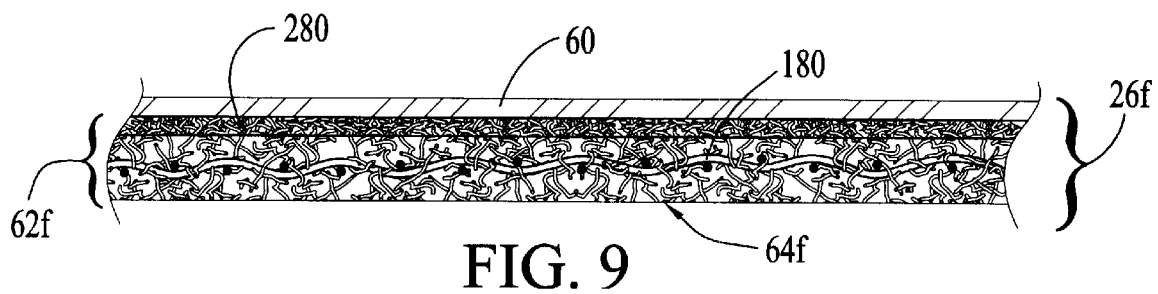

According to another embodiment of the present invention, the substrate 62e (FIG. 8) includes essentially the same structure as that the substrate 62d (FIG. 7). The substrate 62e is constructed to have needled felt 64e in two layers on opposite sides of a scrim 260. A first layer 262 includes a majority of fibers made from the first material with the relatively higher first activation temperature located below the scrim 260, as viewed in FIG. 8. A second layer 264 is located above the scrim 260, as viewed in FIG. 8, and is located adjacent the membrane 60. The second layer 264 includes the second material with the relatively lower second activation temperature. The second layer 264 has a relatively dense distribution of fibers made of the second material. The thickness of the first layer 262 is illustrated in FIG. 8 as being substantially equal to the thickness of the second layer 264, but it will be apparent that the first layer could be different in thickness than the second layer. This structure of the substrate 62e minimizes the overall use of fibers made from the partially crystalline second material because they are located in a portion of the substrate close to the membrane 60 where maximum effective use of the second material is achieved.

In one embodiment, the second layer 264 of the scrimed needled felt 64e includes the blend 80 of the fibers 82, 84 (FIG. 10) or any of the bicomponent fibers 100, 120, 140 or 160 (FIGS. 11–14). The first layer 262 of the scrimed needled felt 64e may include mostly fibers made from the first material with the relatively higher first activation temperature. The second layer 264 may include a homogenous blend 80 of the first fibers 82 (FIG. 12) and the second fibers 84 with the relatively lower second activation temperature. The blend 80 also may include a non-homogenous mixture of the fibers 82, 84 in any suitable relative ratio. The blend 80 of the fibers 82, 84 may be used in the second layer 264 only adjacent the membrane 60 or throughout the entire second layer. The second layer 264 of the substrate 62e may also be constructed to include any of the bicomponent core-sheath fibers 100 (FIG. 11), side-by-side fibers 120 (FIG. 12), segmented fibers 140 (FIG. 13), or lobed fibers 160 (FIG. 14) as described above.

Figure 5:
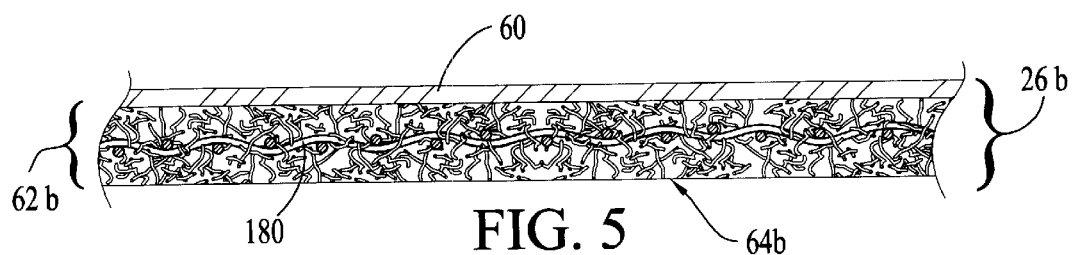
FIGS. 5–9 are views of filter elements, similar to FIG. 4, constructed according to alternate embodiments of the present invention.
Figure 6:
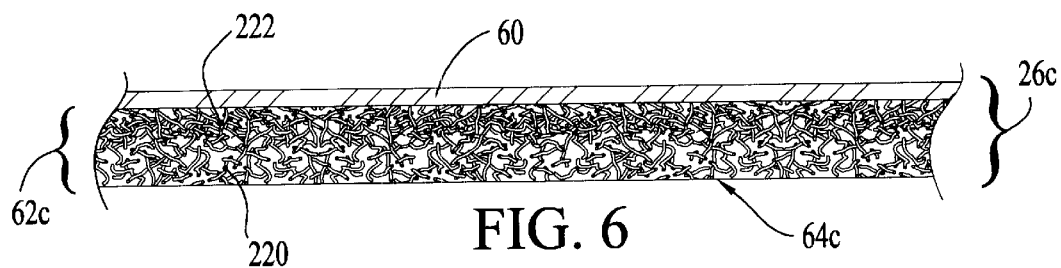

In another embodiment of the present invention, the filter element 26f (FIG. 9) includes the membrane 60 and a substrate 62f constructed similar to that of the scrimed needled felt 64f illustrated in FIG. 5. The needled felt 64f is made mostly from the first material. The needled felt 64f includes the scrim 180. It will be apparent that the scrim 180 could be optional in this embodiment.

The substrate 62f includes an additional cap layer 280 of material located between the membrane 60 and the needled felt 64f. The additional layer 280 is relatively thinner than is the needled felt 64f. The additional cap layer 280 includes the bicomponent fibers 100, 120, 140, or 160 or the blend 80 of the fibers 82, 84 made from two different materials with different activation temperatures. The needled felt 64f and the additional cap layer 280 are made in separate operations and placed in an overlying relationship to engage one another. The additional cap layer 280 is then brought into intimate contact with the membrane 60. The membrane 60, needled felt 64f and additional cap layer 280 are then thermally bonded together by activating the second material of the additional cap layer into both the needled felt and the membrane.

In one embodiment, the additional cap layer 280 of the substrate 62f includes the blend 80 of the fibers 82, 84 (FIG. 10) located above the needled felt 64f (as viewed in FIG. 9) and adjacent the membrane 60. At least a portion of the additional layer 280 of the substrate 62f includes a multiplicity of fibers, such as the blend 80 (FIG. 10) of the fibers 82, 84 or any of the bicomponent fibers 100, 120, 140, 160 (FIGS. 11–14). The additional cap layer 280 may include a homogenous blend 80 of the first fibers 82 (FIG. 10) and the second fibers 84. The blend 80 also may include a non-homogenous mixture of the fibers 82, 84 in any suitable relative ratio.

The first fibers 82 in the blend 80 are made from the first material with the relatively higher first activation temperature. The second fibers 84 in the blend 80 are made from the partially crystalline second material with the second activation temperature that relatively is lower than the first temperature. The second fibers 84 activate first at a lower second temperature than the first fibers 82 and are located in a position to contact and attach to the membrane 60. The first fibers 82 are relatively unaffected when exposed to the temperature at which the second material activates and the relatively high average operating temperature that the filter element 26 is exposed to so the first fibers 82 retain their physical properties, such as tensile strength and elasticity.

There is enough difference between the activation temperatures of the two materials and the application of heat can be controlled sufficiently so that activation of only the partially crystalline second material occurs. The additional cap layer 280 may also be constructed to include any of the fibers 100 (FIG. 11), side-by-side fibers 120 (FIG. 12), segmented fibers 140 (FIG. 13), or lobed fibers 160 (FIG. 14) as described above.

In any of the embodiments described above, it will be noted that the activation of the second material could be done after a pleat forming operation. The pleats can be made to retain their shape when the first layer is exposed to be melting temperature at which the second material melts. This can be advantageous in certain applications, such as in the filters 22 (FIG. 2) and 24 (FIG. 3), where the pleats need to retain their shape during use. The activation of the second material could also be done after the filter element 26a–26b is formed to have a predetermined shape, such as a tube.

A method of making the filter element 26, according to the present invention, includes the steps of providing a substrate 62. The substrate 62 is selected from any suitable structure, such as the scrimmed needled felt 64b, 64d, 64e or 64f or scrimless needled felt 64a or 64c. The substrate 62 is made from at least two different materials. A first one of the materials has a relatively high first activation temperature. A second one of the materials is preferably at least partially crystalline and has a second activation temperature that is relatively lower than the first temperature. A filtering membrane 60 is provided. The filtering membrane 60 is preferably made from expanded polytetrafluoroethylene.

The filtering membrane 60 is supported by the substrate 62. The filtering membrane 60 engages the substrate 62 at numerous locations that have relatively small contact areas. Heat is applied to the components, for example to the filtering membrane 60 as it engages a heated roller that is maintained at a predetermined temperature for a predetermined time. The heat that the partially crystalline second material is exposed to at a location adjacent the membrane 60 is greater than the second activation temperature but less than the first temperature. The membrane 60 is attached to the substrate by activating only the partially crystalline second material in the substrate to soften and flow onto the membrane to fix together the membrane and the substrate after the second material cools to below the second temperature and solidifies.

The preferred fibers 82, 84, 100, 120, 140, 160 are staple textile length from about a quarter inch, and preferably a half inch, up to about three inches or more in length. Such fibers can be in the form of the blend 80 of different activation temperature fibers 82, 84 or the bicomponent core-sheath 100, side-by-side 120, segmented 140 or lobed 160 fiber construction. The lower activation material is a significant portion and preferably a major portion of the exterior surface of the fibers that may contact the membrane 60.

Specific conditions under which the thermal bonding lamination is achieved are illustrated in the examples below. The temperatures referred to are the temperatures to which the fibers are heated in order to achieve a good quality bond in the Example. In order to achieve high speed lamination, higher temperatures with shorter exposure times can be used. The Example below illustrates aspects of the invention which can be modified or varied.

A filter element 26d (FIG. 7) was made by laminating a membrane 60 to a substrate 62d. The membrane 60 (QM002A made by BHA Technologies, Inc.) was thermally laminated to the substrate 62d at a temperature of approximately 425° F. The substrate 62*d* includes scrim 240. The substrate 62*d* includes a layer 242 located below the scrim 240 and made from 5.5 ounces per square yard of polyester fibers, as viewed in FIG. 7. A layer 244 is located above the scrim 240 and made from 5.5 ounces per square yard of polyester fibers, as viewed in FIG. 7. A cap 246 is located above the layer 244 and adjacent the membrane 60.

The cap 246 is constructed of 4.0 ounces per square yard of bicomponent core-sheath fibers 100 (FIG. 11). The core 102 is made of partially polyester (PET) with an activation temperature in the range of 480° F. to 495° F. The sheath 104 is made of partially crystalline polybutylene terephalate (PBT) with an activation temperature in the range of 425° F. to 430° F. The sheath 104 is no greater than twenty five percent (25%) by weight of each fiber 100. The substrate 62*d* and the cap 246 were thermally laminated to the membrane 60 at a temperature of approximately 425° F. which is well below the first activation temperature of the first material. The fibers 100 have a denier no greater than 8.0, preferably 2.0, and a diameter of no more than 40, preferably 15.0, microns. This relatively small size of the fibers 100 assures that a relatively small area of the cap 246 activates to flow, contact and attach to the membrane 60. The laminating temperature is measured at a surface of the thermal bonding equipment in contact with the filter element 26*d*. Typically, lamination of a known polyester substrate is performed at a temperature more than 400° F. on the same thermal bonding equipment resulting in a substrate with an air average permeability of about 6 to 7 Cubic Feet per Minute (CFM) per square foot, as measured by a Frazier air permeability instrument.

Figure 15:
FIG. 15 is an SEM photograph at 80 times magnification illustrating an expanded polytetrafluoroethylene membrane attached to a bicomponent substrate constructed according to the present invention.

The filter element 26*d* as constructed in this Example was tested and had an average air permeability of 4.5 to 5.5 CFM after lamination. A SEM photo of this filter element 26*d* is illustrated in FIG. 15 and shows a relatively small area of attachment between the membrane 60 and the substrate made according to this Example as dark areas. A filter bag 20 (FIG. 1) made with the filter element 26*d* constructed according to this Example is being tested. The preliminary results of the testing show improvement for bag durability, air permeability, filtration efficiency and pressure drop across the filter element during use compared to a known filter element. No appreciable cracking or tearing of the membrane 60 has been found.

From the above description of preferred embodiments of the invention, those skilled in the art will perceive improvements, changes and modifications. Such improvements, changes and modifications within the skill of the art are intended to be covered by the appended claims.

Having described at least one preferred embodiment of the invention, what is claimed is:

1. A filter element comprising:
   a substrate constructed from at least two different materials, a first one of said materials having a first temperature at which said first material activates and a second one of said materials being at least partially crystalline and having a second temperature which is lower than the first temperature at which said second material activates;
   a porous membrane supported by said substrate; and
   an attachment between said substrate and said membrane, said attachment resulting from said second material of said substrate activated at a temperature less than the first temperature to engage portions of said membrane at spaced apart locations and fix together said membrane and said substrate upon said second material then cooling to a temperature less than the second temperature.

2. The filter element of claim 1 wherein said porous membrane is microporous and made from expanded polytetrafluoroethylene.

3. The filter element of claim 1 wherein said substrate further includes a cap and a base, said cap located adjacent said membrane and includes said second material present in a percentage of not more than fifty percent selected from one of the group of by weight and by volume.

4. The filter element of claim 1 wherein said second material is temperature stabilized at a temperature less than the second temperature.

5. The filter element of claim 1 wherein at least a portion of said substrate comprises a multiplicity of bicomponent staple fibers selected from the structures including core-sheath, side-by-side, segmented and lobed, a portion of each of said fibers made of said first material and another portion of each of said fibers made of said second material.

6. The filter element of claim 5 wherein each of said fibers has a diameter of 60 microns or less.

7. The filter element of claim 5 wherein each of said fibers has a denier of 8 or less.

8. A filter element comprising:
   a substrate;
   a micro porous membrane supported by said substrate;
   said substrate including a cap located adjacent said porous membrane and constructed from at least two different materials, a first one of said materials having a first temperature at which said first material activates and a second one of said materials being at least partially crystalline and having a second temperature which is lower than the first temperature at which said second material activates; and
   an attachment between said cap and said membrane, said attachment resulting from said second material of said cap activated at a temperature less than the first temperature to engage portions of said membrane at spaced apart locations and fix together said membrane and said cap upon said second material then cooling to a temperature less than the second temperature.

9. The filter element of claim 8 wherein said cap comprises a multiplicity of bicomponent staple fibers selected from the structures including needled felt with a scrim and scrimless needled felt.

10. The filter element of claim 9 wherein each of said fibers have a diameter of 40 microns or less.

11. The filter element of claim 9 wherein each of said fibers have a denier of 8 or less.

12. The filter element of claim 8 wherein said second material is temperature stabilized at a temperature less than the second temperature.

13. The filter element of claim 8 wherein said cap is located adjacent said membrane and includes said second material present in a percentage of not more than fifty percent selected from one of the group of by weight and by volume and further including a base made mostly from said first material.

14. The filter element of claim 8 wherein said microporous membrane is made from expanded polytetrafluoroethylene.

15. A filter element comprising:
   an expanded polytetrafluoroethylene membrane;
   a substrate including a base and a cap located adjacent said membrane and constructed from at least two different materials, a first one of said materials having a first temperature at which said first material activates and a second one of said materials being at least partially crystalline and having a second temperature which is lower than the first temperature at which said second material activates; and an attachment between said cap and said membrane, said attachment resulting from said second material of said cap activated at a temperature less than the first temperature to engage portions of said membrane at spaced apart locations and fix together said membrane and said cap upon said second material then cooling to a temperature less than the second temperature.

16. The filter element of claim 15 wherein said cap comprises a multiplicity of bicomponent staple fibers selected from the structures including needled felt with a scrim and scrimless needled felt.

17. The filter element of claim 16 wherein each of said fibers have a diameter of 40 microns or less.

18. The filter element of claim 16 wherein each of said fibers have a denier of 8 or less.

19. The filter element of claim 15 wherein said second material is temperature stabilized at a temperature less than the second temperature.

20. The filter element of claim 15 wherein said cap is located adjacent said membrane and includes said second material present in a percentage of not more than fifty percent selected from one of the group of by weight and by volume and said base made mostly from said first material.

* * * * *